United States Patent
Burget et al.

(10) Patent No.: US 8,291,235 B2
(45) Date of Patent: Oct. 16, 2012

(54) METHOD AND SYSTEM FOR CONTROLLING ACCESS OF CLIENTS AND USERS TO A PRINT SERVER

(75) Inventors: Art H. Burget, Meridian, ID (US); Brennen W. Stollfus, Eagle, ID (US); Steven D. Thorne, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3326 days.

(21) Appl. No.: 10/652,010

(22) Filed: Aug. 29, 2003

(65) Prior Publication Data

US 2005/0046876 A1 Mar. 3, 2005

(51) Int. Cl.
G06F 12/14 (2006.01)
G06F 15/16 (2006.01)
H04L 29/06 (2006.01)
H04L 9/32 (2006.01)
H04L 9/08 (2006.01)
H04L 9/00 (2006.01)
H04L 9/28 (2006.01)
H04K 1/00 (2006.01)
G09C 5/00 (2006.01)
H04B 1/38 (2006.01)

(52) U.S. Cl. ........ 713/189; 713/155; 713/160; 713/161; 713/165; 713/167; 713/168; 713/171; 380/255; 380/270; 380/278; 380/28; 380/44; 380/55; 709/219; 455/557

(58) Field of Classification Search .................. 713/189, 713/155, 160, 161, 165, 167, 168, 171; 380/255, 380/270, 278, 28, 44, 55; 709/219; 455/557
See application file for complete search history.

(56) References Cited

U.S. PATENT DOCUMENTS

| | | | |
|---|---|---|---|
| 5,014,221 A | 5/1991 | Mogul | |
| 5,303,336 A | 4/1994 | Kageyama et al. | |
| 7,305,556 B2 * | 12/2007 | Slick et al. | 713/169 |
| 2002/0169002 A1 * | 11/2002 | Imbrie et al. | 455/557 |
| 2003/0044009 A1 * | 3/2003 | Dathathraya | 380/55 |
| 2004/0109567 A1 * | 6/2004 | Yang et al. | 380/277 |
| 2004/0109568 A1 * | 6/2004 | Slick et al. | 380/277 |
| 2004/0111610 A1 * | 6/2004 | Slick et al. | 713/160 |
| 2004/0128513 A1 * | 7/2004 | Wu et al. | 713/176 |

* cited by examiner

Primary Examiner — Aravind Moorthy

(57) ABSTRACT

A method of controlling use of a printer on a network includes providing a key to a client on the network. The key is then used to submit a print job from the client to a printer on the network.

46 Claims, 7 Drawing Sheets

METHOD AND SYSTEM FOR CONTROLLING ACCESS OF CLIENTS AND USERS TO A PRINT SERVER

BACKGROUND

With a personal computer and an appropriate software package, a user can produce virtually any type of document that may be desired. For example, word processing software is used to produce text documents. Graphic design or computer-aided design software can be used to produce diagrams, charts, graphs, designs, etc. Spreadsheet software allows a user to manage large amounts of financial and other types of information.

Frequently, it is desirable to generate a hardcopy of a document or data set that is produced or stored on a personal computer or server. A hardcopy may be desired, for example, for record keeping purposes or to share with another party. Consequently, a wide variety of printers and printing devices have been developed that can receive a print job from a host computer and produce a hardcopy of the document or data represented by that print job. As used herein and in the appended claims, the term "printer" is broadly used to refer to any device that produces a hardcopy output. A "print job" is data used by a printer to generate a hardcopy output.

Printers are generally characterized as "stand-alone" or "networked." A stand-alone printer is connected directly to a port of the computer system or client device for which it is used and is often located physically near the computer system. Networked printers, on the other hand, are connected to a network such as a local area network (LAN) or a wide area network (WAN) and may be used by any computer system or other client device connected to the same network. As used herein and in the appended claims, the term "client" or "client device" is broadly used to refer to any device or executing program that generates a print job for a printer.

It is common to manage the communications between printers and clients on a network using a print server. A print server is a device that is dedicated to installing, configuring, and managing networked printers without affecting or placing demands on a network's servers. For example, print servers may install printer drivers on clients of the network that enable the clients to send print jobs to the networked printers. They may also manage and distribute print jobs that are generated by clients of the network to the various printers on the network.

Many print servers are configured to restrict certain users' access to the available networked printers. This is typically done by controlling a set of "permissions" assigned to each user. For example, a particular user may be permitted by the print server to send a print job to one printer on the network, but not to another. Print servers restrict access to networked printers for a variety of reasons including, but not limited to, printing capacity, security, and economic reasons.

Permissions are usually managed on a domain level. In other words, each time a user logs on to a client anywhere in the network, the client communicates with the print server or with a different server where permissions for each user are stored. If the print server communicates to the client that the user has permission to print to a specific printer, the client device will then allow the user to address a print job to that printer. The client device or print server may refuse to submit a print job to any printer for which the user does not have permission. Therefore, the permissions assigned to a user will be effective regardless of the client device on the network that the user has accessed. Domain level permission management makes it difficult to restrict printing from specific clients.

SUMMARY

A method of controlling use of a printer on a network includes providing a key to a client on the network. The key is then used to submit a print job from the client to a printer on the network.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

A method for controlling the source of print job requests to a printer or print server is described herein. The method uses a key distribution process to control which clients have permissions to send print job requests to a printer or print server. In an additional embodiment, the key distribution process controls which users of a specific client have permission to send print job requests to a printer print server.

Figure 1:
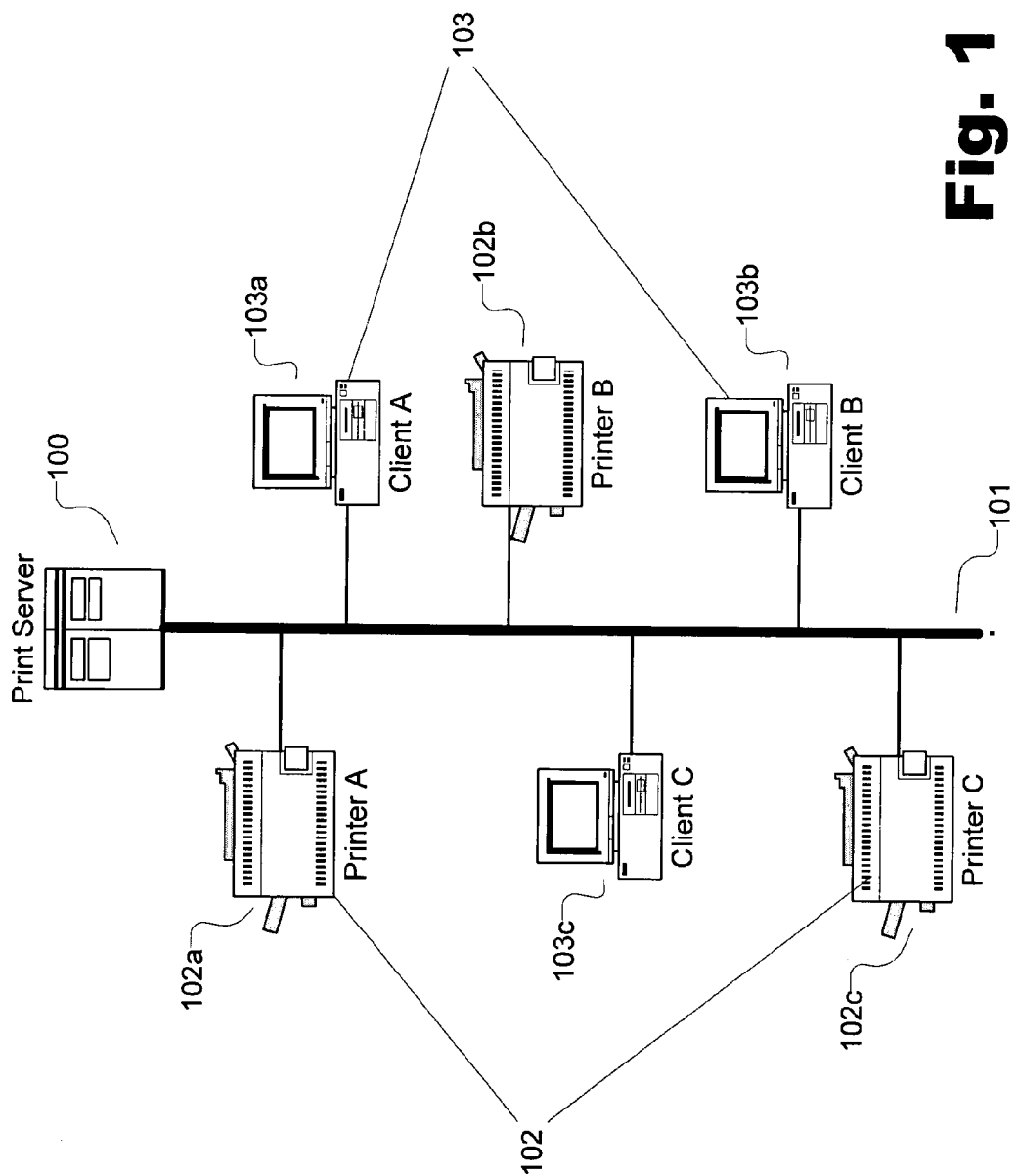
FIG. 1 shows an exemplary network configuration with a print server, multiple printers, and multiple clients attached to a network, according to one embodiment.

FIG. 1 shows an exemplary network configuration with a print server, multiple printers, and multiple clients connected to a network, according to an exemplary embodiment. As shown in FIG. 1, a network (101) connects together a print server (100), a number of printers (102), and a number of clients (103). The network (101) may be a LAN, WAN, the Internet, or other private or public network.

As shown in FIG. 1, a print server (100) is connected to the network (101). The print server (100) may be any type of server capable of controlling client or user access to the printers (102) that it manages, according to an exemplary embodiment. According to an alternate exemplary embodiment, the print server (100) may be a server or device that performs functions in addition to managing the printers (102). For example, the print server (102) may be integrated into a web server, file server, personal computer, or into a networked printer itself.

In addition to the print server (100), there are a number of printers (102) connected to the network (101) of FIG. 1. The exemplary network configuration of FIG. 1 has three printers (102) connected to the network (101) for illustrative purposes only. There may be any number of printers connected to the network (101). The present method will be described in context of printers. However, the method described herein may be used to control access to any device that may be connected to the network (101). For example, the method may control access to devices such as servers, computers, scanners, and other devices instead of or in addition to printers.

There are also a number of clients (103) connected to the exemplary network (101) of FIG. 1. A client is a device or program that interfaces with a server over a network. A client typically sends print jobs to a networked printer (102) through the print server (100). The exemplary network configuration of FIG. 1 has three clients (103) connected to the network (101) for illustrative purposes only. There may be any number of clients connected to the network (101). The clients (103) may each be a personal computer, a workstation, or any other device or program that can be configured to send a print job to one of the printers (102).

Each printer (102) of FIG. 1 is associated with a driver. A driver is software that is used by a client (103) to generate a print job compatible with a particular printer (102). According to an exemplary embodiment, the print server (100) is configured to automatically install printer drivers associated with the various printers (102) connected to the network (101) onto the clients (103) so that the clients (103) may be able to send print jobs to the printers (102). With this capability of the print server (100), the clients (103) need not be manually updated with drivers to account for the presence of a new printer on the network (101).

In an exemplary embodiment, the print server (100) controls a client's ability to print to certain printers (102) on the network (101) using a key distribution process. For example, the print server (100) may allow client A (103a) and client C (103c) to print to printer A (102a), but not allow client B (103b) to print to printer A (102a). Likewise, the print server (100) may allow client A (103a) to print to printer A (102a) and printer B (102b), but not to printer C (102c). The key distribution process will now be described in connection with FIGS. 2 and 3.

Figure 2:
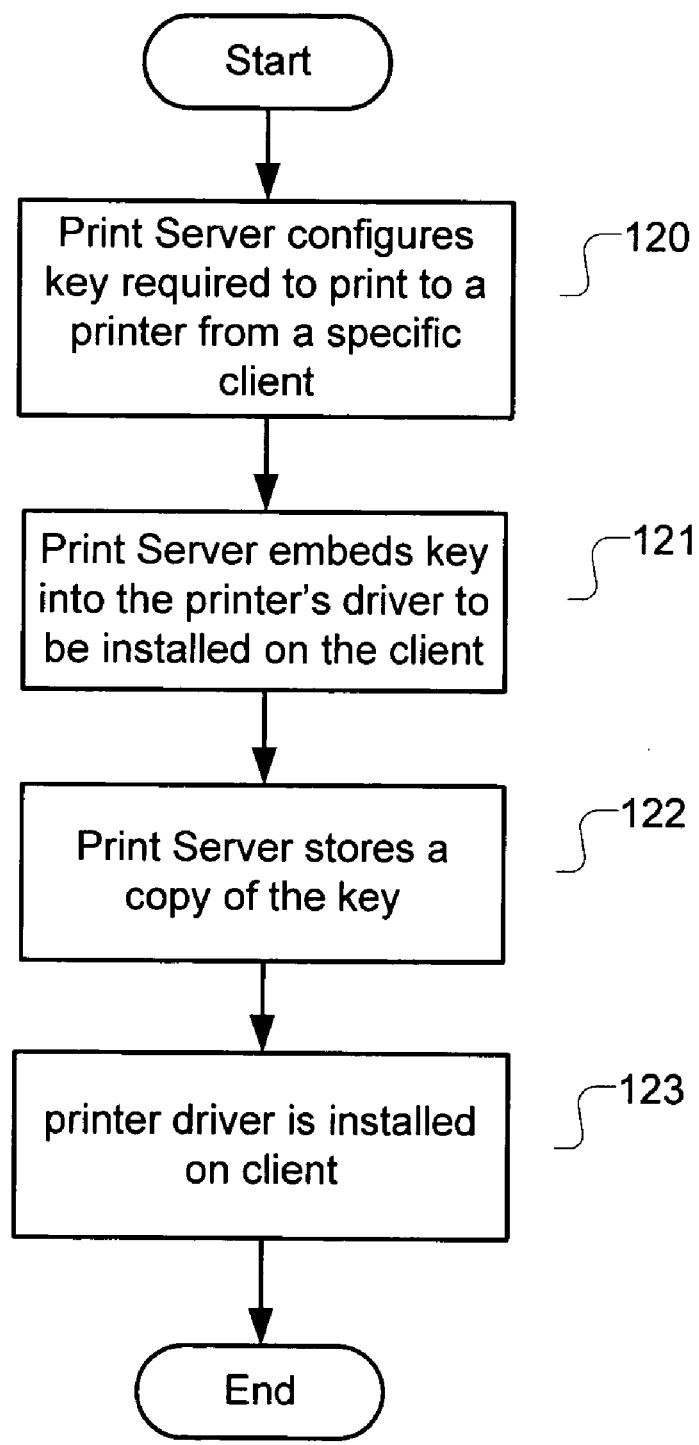
FIG. 2 is a flow chart illustrating an exemplary key distribution process, according to one embodiment.

FIG. 2 is a flow chart illustrating an exemplary key distribution process. The steps of FIG. 2 are exemplary steps only and may be modified or changed as best serves a particular application.

As shown in FIG. 2, the print server (100, FIG. 1) first configures a key that is required to send a print job to a printer from a client (step 120). As will be understood by one skilled in the art, a key may be a sequence of random or pseudorandom bits. A key is used to encrypt and decrypt an electronic transaction, such as a print job request. According to an exemplary embodiment, the client uses the key to encrypt a print job request that is sent to the print server. The print job request comprises commands, which, if accepted by the print server, cause a particular printer to print the print job.

The key is configured by a configuration utility that is part of the print server, according to an exemplary embodiment. There are many possible configuration utilities that could be used to generate the key, as will be understood by one skilled in the art. For example, the configuration utility may be an embedded web server that resides on the print server or may be any other type of utility capable of generating a key.

The key generated by the print server is client-specific, according to an exemplary embodiment. In other words, the print server configures a different key for each client that is to have printing privileges to a particular printer. Thus, each client may only use the key that was specifically configured for that client to use.

In an alternative embodiment, the print server generates only one key for a particular printer. In this case, each client that is to have printing privileges to the printer uses a copy of that key.

The key generated by the print server is also printer-specific, according to an exemplary embodiment. In other words, the key may only be used by a client to encrypt a print job request for a specific printer. If the client tries to send a print job to a printer using a key that was configured for a different printer, the print server will not be able to successfully decrypt the print job request and the print job request will be denied. The remaining steps of the flow chart of FIG. 2 will be described using keys that are printer-specific. However, in an alternative embodiment, the key generated by the print server may not be printer-specific. In this case, the key could be used by a client to encrypt a print job request for any printer on the network.

After the print server configures the key, the print server embeds a copy of the key into the printer driver that is to be installed on the client (step 121). The print server also stores a copy of the key in a storage device for later use (step 122). The storage device may be a hard drive or memory unit located on the print server (100), for example. In an alternative embodiment, the print server (100) remotely stores a copy of the key on a storage device located on another server or network device.

After a copy of the key is imbedded in the printer driver, the printer driver is installed on the client (step 123). By embedding the key in the printer driver, no additional software need be installed on the client. Once the driver is installed, the key resides on the client and may be used by the client to encrypt a print job request that the client sends to the print server (100). Because the key is client-based, a print job request may be successfully sent to the print server (100) by the client, regardless of the client's user.

Figure 3:
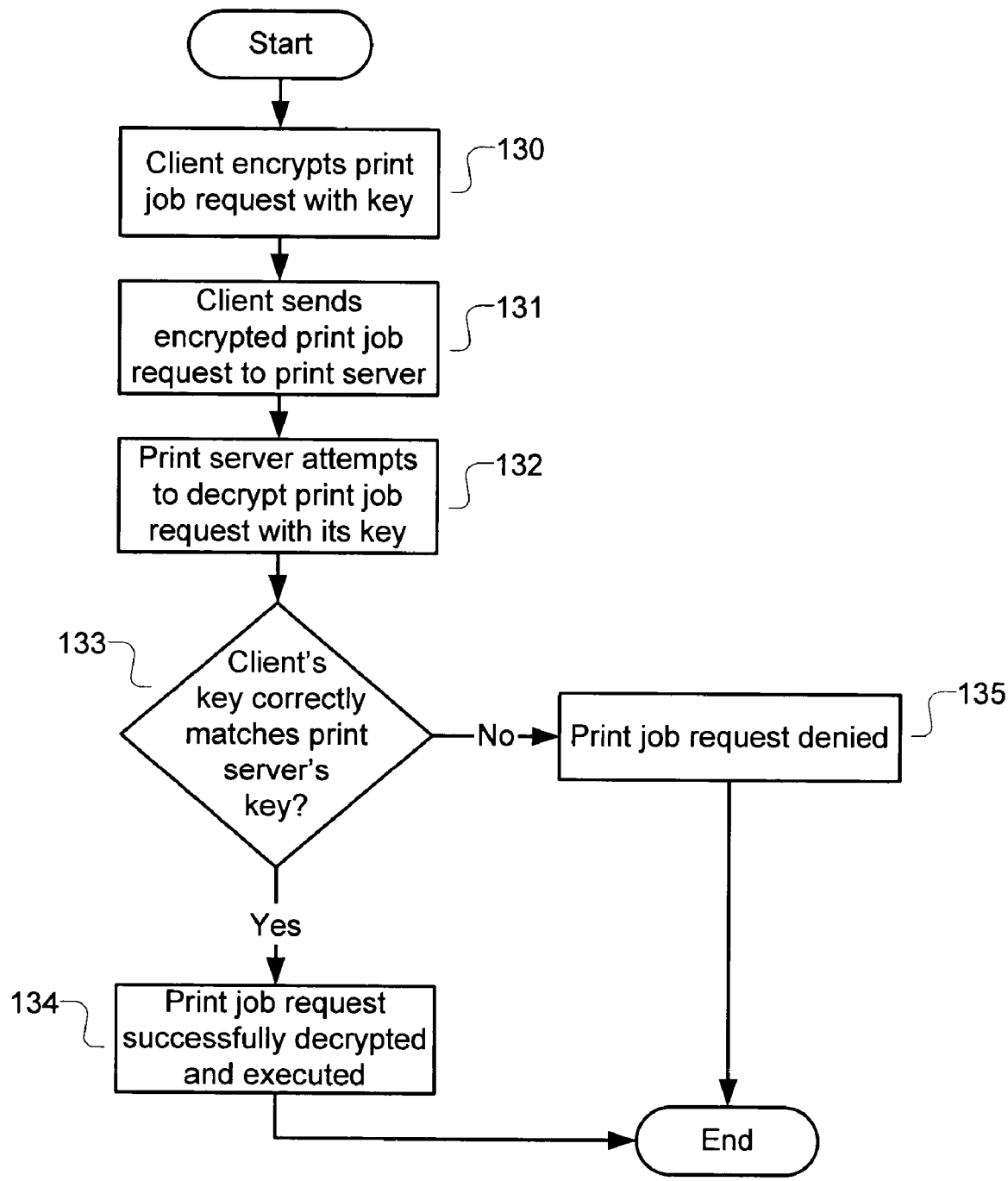
FIG. 3 is a flow chart illustrating an exemplary method of sending a print job request from a client to a print server using a key, according to one embodiment.

FIG. 3 is a flow chart illustrating an exemplary method of sending a print job request from a client to a print server using a key, according to an exemplary embodiment. The method entails a process of encrypting, sending, and decrypting the print job request using a key that has been generated by the print server using the process described in connection with FIG. 2. The process described in FIG. 3 is exemplary only and may be modified as best serves a particular application.

As shown in FIG. 3, the process starts with the client encrypting a print job request with the key that was sent to that client by the print server (100, FIG. 1) (step 130). The print job request may be a request to print to a specific printer that is attached to the network (101, FIG. 1). There are various encrypting methods that may be used to encrypt the print job request with the key, as will be understood by one skilled in the art. Any of these encryption methods may be used under the principles described herein. Additionally, the print job request need not be actually encrypted, but may merely be submitted to the print server in association with the key assigned to that client so as to identify the client from which that print job request originates. For simplicity, this will be considered and referred to as a method of "encrypting" the print job request.

After the print job request is encrypted, the client sends the encrypted print job request to the print server over the network (step 131). Encrypting the print job request enhances network security because it is difficult to intercept and decrypt an encrypted print job request. When the print server receives the encrypted print job request from the client, it attempts to decrypt the print job request with the key that it originally configured for the client (step 132). If the client's key correctly matches the print server's (100) key (step 133), then the print job request may be successfully decrypted and executed (step 134). However, if the key that the print server (100) uses does not correctly match the key that the client uses, the print job request cannot be decrypted and is therefore denied (step 135).

The key distribution process and the ensuing print job request process described in connection with FIGS. 2 and 3 may be accomplished using one of many possible cryptography methods, according to an exemplary embodiment. For example, secret-key cryptography may be used. In secret-key cryptography, also referred to as symmetric session cryptography, the same key is used for both encryption and decryption. Thus, according to one exemplary embodiment, the print server keeps an exact copy of the key that is installed on the client and uses that key to decrypt any print job requests that are encrypted by the client.

Other cryptography methods such as the RSA (Rivest, Shamir and Adleman) public-key cryptosystem may be used to facilitate the key distribution and print job request processes. In such process, the key used by the printer to encrypt a print job request is related to, but different from, the key used by the print server to decrypt the print job request. This may provide some additional security over a symmetric system using a single key for both encryption and decryption. As used herein and in the appended claims then, a "related key" may be a copy of the key used for encryption or a key related to the key used for encryption which can be successfully used to decrypt a print job encrypted by the encryption key.

The key distribution process described in FIGS. 2 and 3 will be illustrated using the network configuration of FIG. 1. In this example, it is desirable for client A (103a) to be able to send print jobs to printer B (102b) regardless of the user operating client A (103a). The print server (100) therefore configures a key and embeds that key in the printer driver for printer B (102b). The print server (100) then installs the customized printer driver on client A (103a). If client A (103a) already has a printer driver installed for printer B (102b) but does not have the key, then the printer driver may be re-installed so that the installed version will have the key necessary to print to printer B (102b). In an alternative embodiment, the driver may be re-configured with the key information rather than being completely reinstalled. In another alternative embodiment, only the key is installed on client A (103a) for use by the printer driver on client A, if client A (103a) already has the appropriate printer driver for printer B (102b).

Once client A (103a) receives the printer driver and/or key from the print server (100), client A (103a) may send a print job request to the print server (100) for printer B (102b). To do so, client A (103a) encrypts the print job request with the key provided by the print server (100). Client A (103a) then sends the encrypted print job request to the print server (100), or, in some embodiments, may send the encrypted print job request directly to printer B (102b). The print server (100) or printer B (102b) then attempts to decrypt the print job request using a copy of the key or a related key. If the key used to decrypt the print job request matches or is appropriately related to the key that client A (103a) used to encrypt the print job request, the print job request may be successfully decrypted. The print server (100) then directs the print job to printer B (102b) and the job is printed.

In this example, client A (103a) cannot send print jobs to printer B (102b) or to printer C (102c) because it does not have the keys required to send print jobs to either of these printers. Furthermore, it does not matter which user is using client A (103a) to send the print job to printer B (102b).

Figure 4:
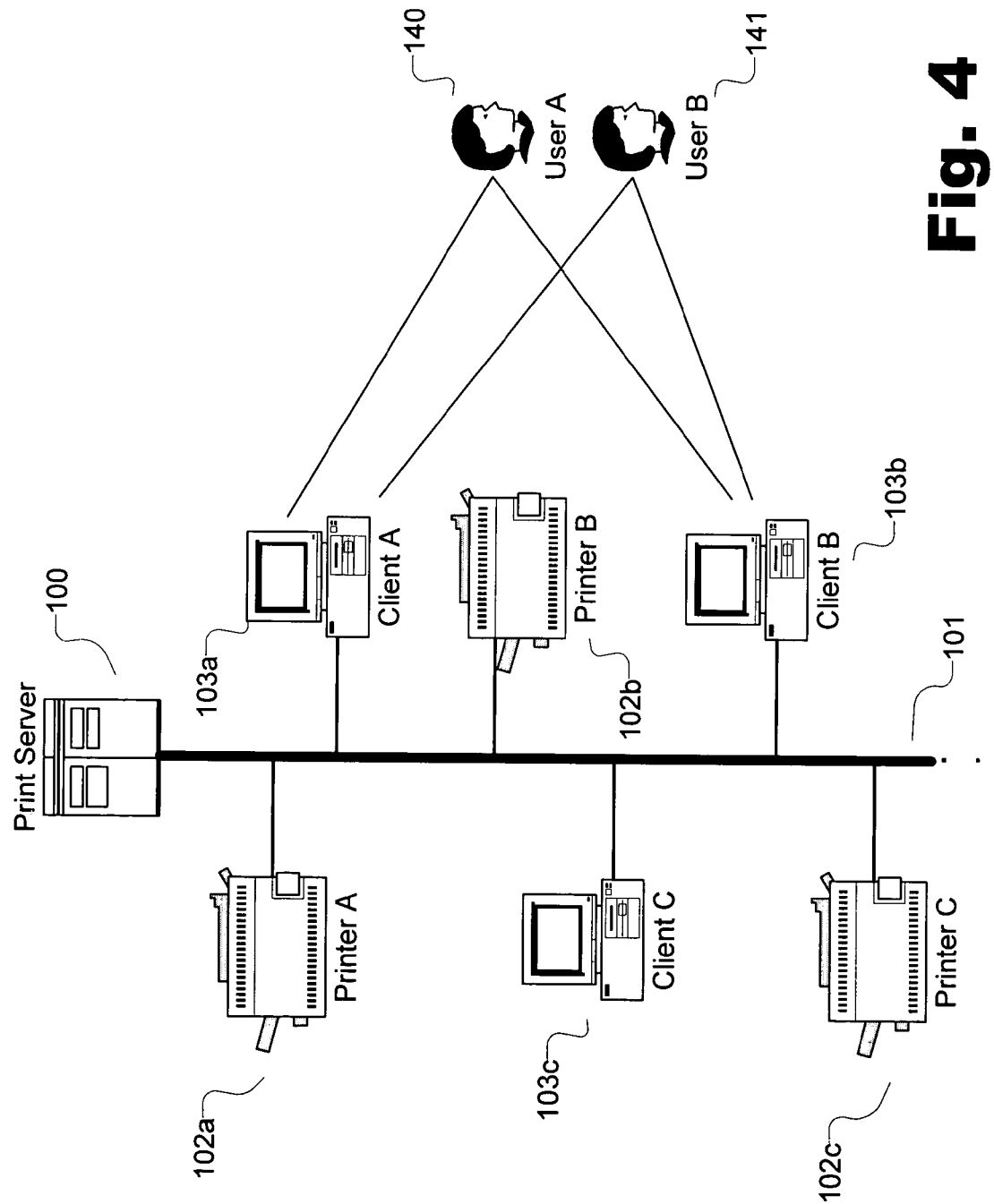
FIG. 4 shows an exemplary network configuration with a number of users, according to one embodiment.

FIG. 4 will be used to illustrate another embodiment in which a key distribution process controls which users have permissions to send print jobs from clients on a network to a printer on the network. The network configuration of FIG. 4 is identical to that of FIG. 1. However, FIG. 4 also shows that the exemplary network configuration of FIG. 1 may have a number of users. The users may be employees of a company, students of a school, or any other type of person who uses one or more of the clients (103) connected to the network (101).

There are two exemplary users in FIG. 4—user A (140) and user B (141). As shown in FIG. 4, user A (140) and user B (141) are each users of client A (103a) and client B (103b). FIG. 4 shows two users (140, 141) for explanatory purposes only. There may be any number of users of any or all of the clients (103).

According to an exemplary embodiment, the key distribution process controls which users have permissions to send print jobs from clients (103) on the network (101) to one of the printers (102) on the network (101). For example, the print server (100) may allow user A (140), but not user B (141), to print to printer A (102a) from client A (103a). Another example is that the print server (100) may allow user A (140) to print to printer A (102a) from client A (103a), but not from client B (103b). The key distribution process will now be described in connection with FIGS. 5 and 6.

Figure 5:
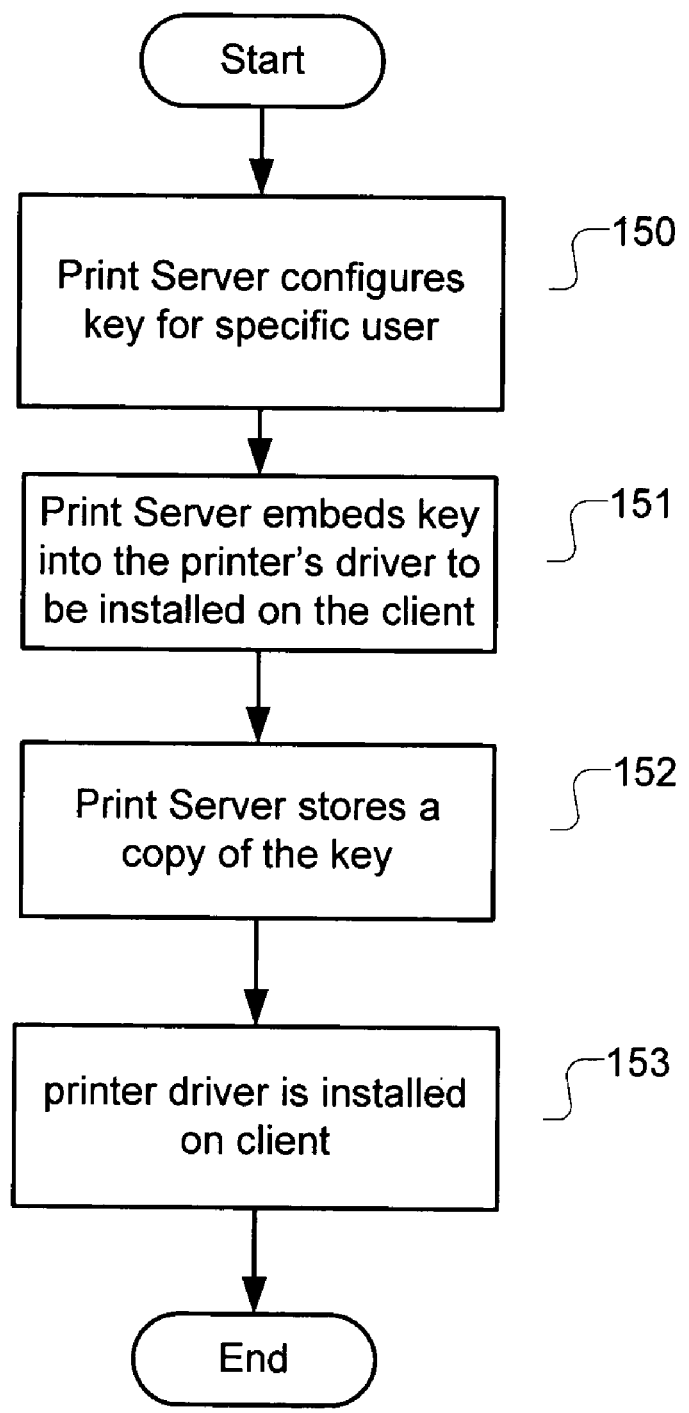
FIG. 5 is a flow chart illustrating an exemplary key distribution process that allows a user to print to a printer from a particular client, according to one embodiment.

FIG. 5 is a flow chart illustrating an exemplary key distribution process that allows a user to print to a printer from a particular client, according to an exemplary embodiment. The steps of FIG. 5 are exemplary steps only and may be modified or changed as best serves a particular application.

As shown in FIG. 5, the print server (100, FIG. 1) first configures a key for a specific user (step 150). According to an exemplary embodiment, the user's client uses this key to encrypt a print job request that is sent to the print server. Thus, the user may print from any client that has a copy of the key or a related key that was configured specifically for the user. In an alternative embodiment, the key is not configured for a specific user only—rather it may be used by multiple users. However, the remaining steps of the flow chart of FIG. 5 will be described using a key that has been configured for a specific user.

The key is configured by a configuration utility that is part of the print server, according to an exemplary embodiment. As mentioned above, there are many possible configuration utilities that could be used to generate the key. For example, the configuration utility may be an embedded web server that resides on the print server or may be any other type of utility capable of generating a key.

The key generated by the print server (100) is printer-specific, according to an exemplary embodiment. In other words, the key may only be used by a client to encrypt a print job request for a specific printer. If a client tries to send a print job to a printer using a key that was configured for a different printer, the print server will not be able to successfully decrypt the print job request and the print job request will be denied. The remaining steps of the flow chart of FIG. 5 will be described using keys that are printer-specific. However, in an alternative embodiment, the key generated by the print server (100) is not printer-specific. In this case, the key could be used by a client to encrypt a print job request for any printer on the network.

After it configures the key for a specific user, the print server (100) embeds a copy of the key or a related key into the printer's driver that is to be installed on the client (step 151). It also stores a copy of the key or a related key in a storage device for later use (step 152). The storage device may be a hard drive or memory unit located on the print server (100), for example. In an alternative embodiment, the print server (100) remotely stores a copy of the key or related key on a storage device located on another server or network device.

After the key is imbedded in the printer driver, the printer driver is installed on the client (step 153). By embedding the key in the printer driver, no additional software need be installed on the client. Once the driver is installed, the key resides on the client and the may be used by the client to encrypt a print job request made by the user. Because the key is user-based, a user may successfully send a print job request to the print server from any client with the installed driver and key.

Figure 6:
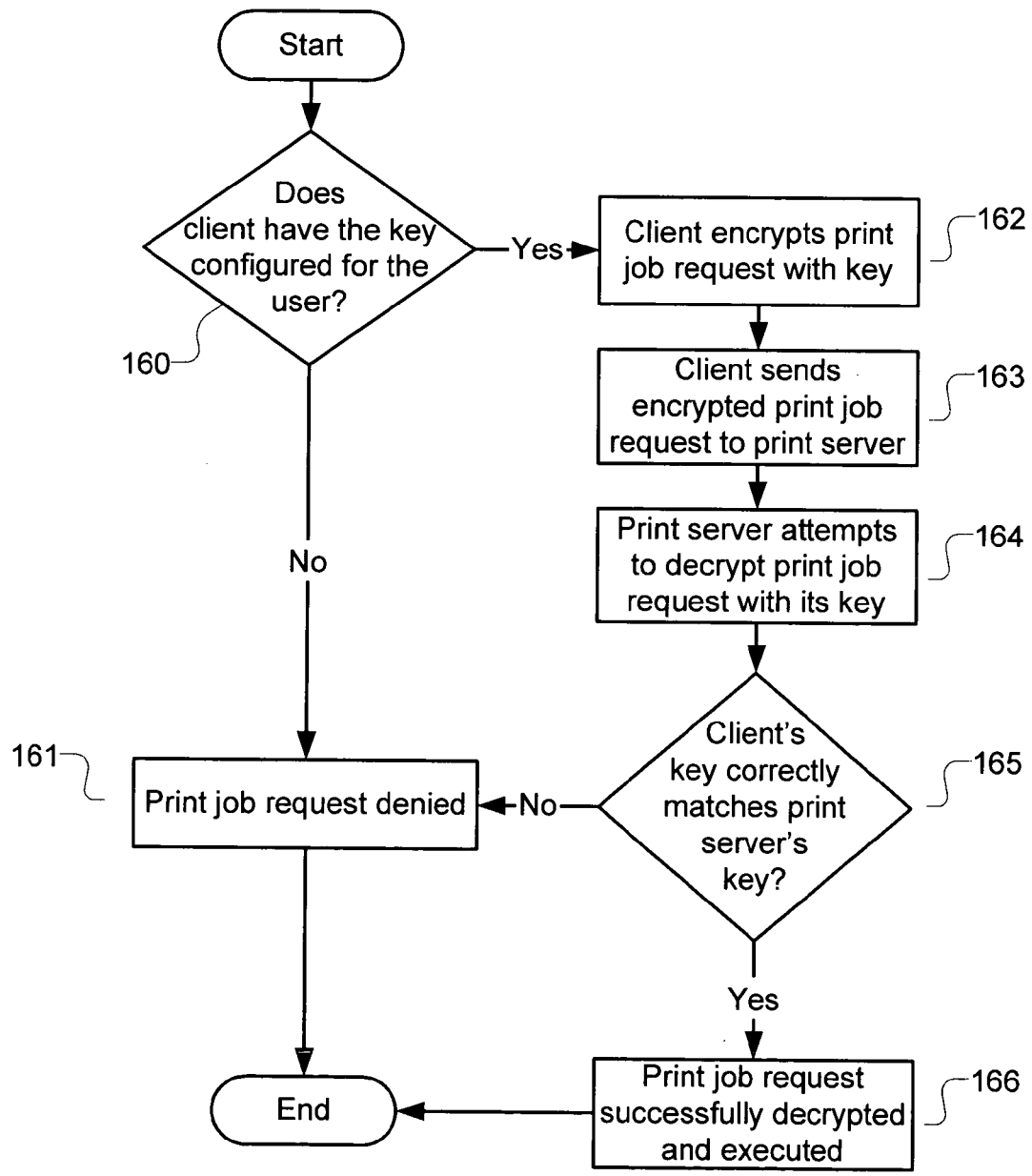
FIG. 6 is a flow chart illustrating an exemplary method that may be used when a user desires to print to a specific printer on a network by sending a print job request from a client to a print server, according to one embodiment.

FIG. 6 is a flow chart illustrating an exemplary method that may be used when a user desires to print to a specific printer on a network by sending a print job request from a client to a print server. The method entails a process of encrypting, sending, and decrypting the print job request using a key that has been generated by the print server using the process described in connection with FIG. 5. The process described in FIG. 6 is exemplary only and may be modified as best serves a particular application.

As shown in FIG. 6, the client from which the user desires to print may only correctly encrypt a print job request if that client has a copy of the key or a related key that was configured specifically for the user (step 160). If the client does not have the appropriate key, the print job request cannot be completed (step 161). For example, based on the user's identification when logging into the client, the client may recognize that the user has no printing privileges from that client, i.e., the client has no keys for encrypting or identifying a print job from this user. Consequently, the client may refuse to generate any print jobs for that particular user (step 161). However, if the client does have an appropriate key assigned to the user, the client encrypts a print job request with that key that was provided by the print server (100, FIG. 1) (step 162). As mentioned above, there are various encrypting methods that may be used to encrypt the print job request with the key that can be used under the principles described herein.

After the print job request is encrypted, the client sends the encrypted print job request to the print server over the network (101, FIG. 1) (step 163). Encrypting the print job request enhances network security because it is difficult to intercept and decrypt an encrypted print job request. When the print server receives the encrypted print job request from the client, the print server attempts to decrypt the print job request with the same or a related key that was originally configured for that client (step 164). If the key that the client uses correctly matches the print server's key (step 165), then the print job request may be successfully decrypted and executed (step 166). However, if the key that the print server uses does not correctly match the key that the client uses, the print job request cannot be decrypted and is therefore denied (step 161).

The key distribution process and the ensuing print job request process described in connection with FIGS. 5 and 6 may be accomplished using one of many possible cryptography methods, according to an exemplary embodiment. As mentioned above, for example, both symmetric and asymmetric encryption systems may be used.

The key distribution process described in FIGS. 5 and 6 will be illustrated using the network configuration of FIG. 4. In this example, it is desirable for user A (140), but not user B (141), to print to printer A (102a) from client A (103a). It is also desirable for user A (140) to print to printer A (102a) from client A (103a), but not from client B (103b). The print server (100) therefore configures a key specifically for user A (140) and embeds that key in the printer driver for printer A (102a). The print server (100) then installs the customized printer driver on client A (103a). If client A (103a) already has the printer driver installed for printer A (102a), but does not have the key, then the driver is re-installed so as to have the key necessary for user A to print to printer A (102a). In an alternative embodiment, the driver may be re-configured with the key information rather than completely reinstalled. In another embodiment, only the key is installed on client A (103a) if client A (103a) already has the printer driver for printer A (102a).

Once client A (103a) receives the printer driver and key from the print server (100), user A (140) may send a print job request to the print server (100) from client A (103a). To do so, client A (103a) encrypts the print job request with the key that was specifically configured for user A (140) and provided by the print server (100). Client A (103a) then sends the encrypted print job request to the print server (100). The print server (100) then attempts to decrypt the print job request using a copy of the key or a related key. If the key that the print server (100) uses to decrypt the print job request matches the key that client A (103a) used to encrypt the print job request, the print job request may be successfully decrypted. The print server (100) then directs the print job to printer A (102a) and the job is printed.

User B (141), on the other hand, may not print from client A (103a) to printer A (102a) even though there is a key residing on client A (103a). This is because the key may only be used by user A (140), regardless of user B's (141) network privileges. The only way user B (141) may print from client A (103a) is for the print server (100) to configure a key for user B (141) and install that key or a related key on client A (103a). The client will distinguish between users, for example, based on the user's login identification or credentials used to access that client. Although user A (140) may print to printer A (102a) from client A (103a), he or she many not print from client B (103b) unless the print server (100) installs a copy of the key for user A on client B (103b).

Figure 7:
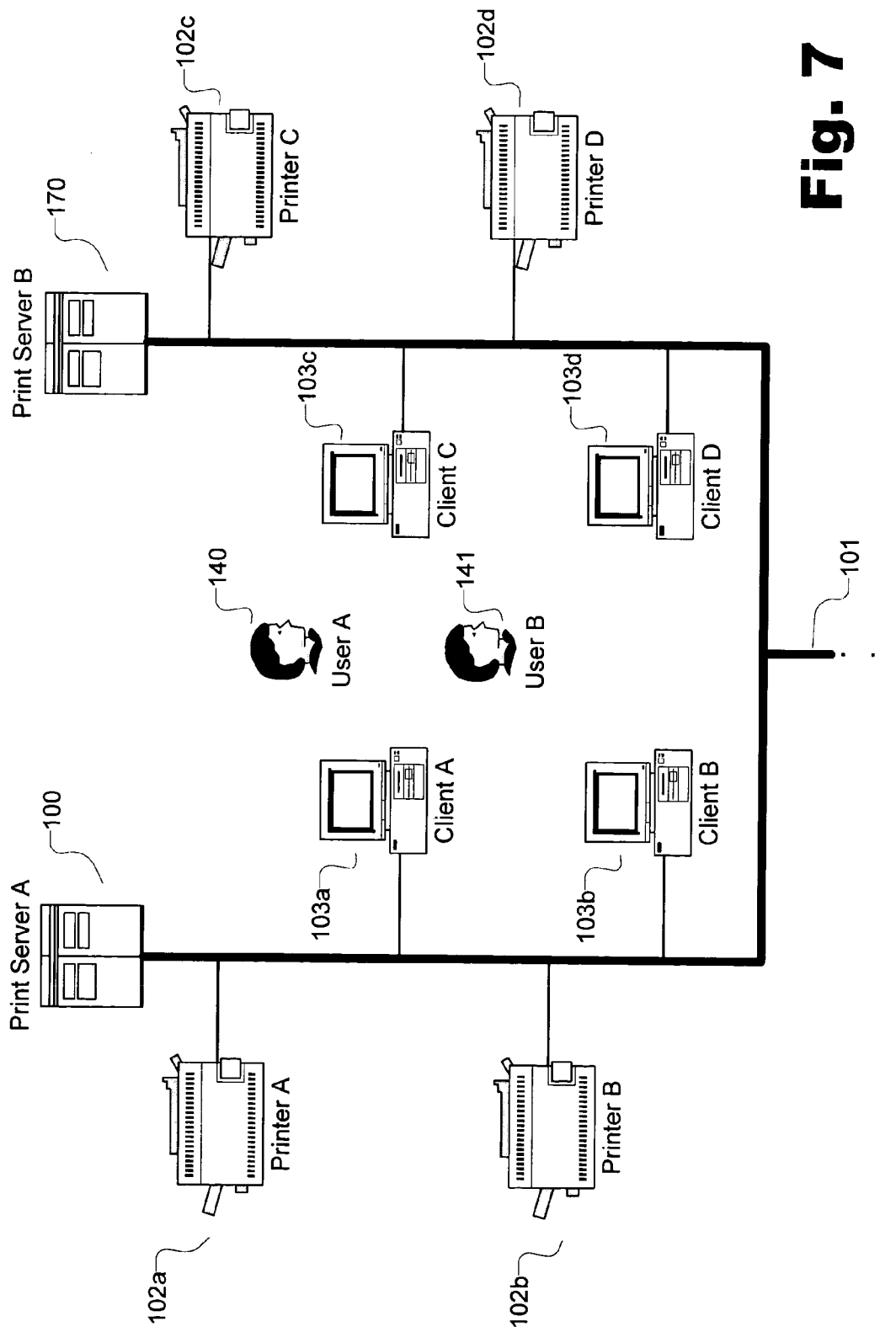
FIG. 7 shows an exemplary network configuration with more than one print server, according to one embodiment.

In another exemplary embodiment, the key distribution process controls client and user access to more than one print server. The process is similar to the processes described in detail above. FIG. 7 shows that a network configuration may have more than one print server. The exemplary network configuration of FIG. 7 has two print servers connected to the network (101)—print server A (100) and print server B (170). The network configuration, like the network configurations of FIG. 1 and FIG. 4, has a number of printers (102) and clients (103) attached to the network (101). In the exemplary network configuration of FIG. 7, print server A (100) manages print job requests for printers A and B (102a,b) and print server B (170) manages print job requests for printers C and D (102c,d).

FIG. 7 also shows that the network configuration may have a number of users. There are two exemplary users in FIG. 7—user A (140) and user B (141). Both of these users (140, 141) may use any of the clients (103). FIG. 4 shows two users (140, 141) for explanatory purposes only. According to an exemplary embodiment, there may be any number of users of any or all of the clients (103).

According to an exemplary embodiment, a print server such as print server A (100) or print server B (170) may generate a key for a specific client, a specific user, or both. The key is used to encrypt a print job request for any printer attached to the print server. This key may then be embedded in one of the drivers that is installed on the selected clients. In this way, access to the print server itself may be controlled through the use of the key distribution process.

The methods of generating, distributing, and using the key to control access to a print server are similar to those described in connection with FIGS. 2, 3, 5, and 6. Thus, a redundant explanation here will be omitted.

FIG. 7 will be used to illustrate the key distribution process that controls access to a print server. In this example, it is desirable for user A (140), but not user B (141), to print from any client (103) on the network to any of the printers managed by print server A (100). It is also desirable for any user of client C (103c) to be able to print to any of the printers managed by print server B (170), but not by print server A (100). In the exemplary network configuration of FIG. 7, print server A (100) manages print job requests for printers A and B (102a,b) and print server B (170) manages print job requests for printers C and D (102c,d).

Print server A (100) therefore configures a key specifically for user A (140) and embeds that key or a related key in either of the printer drivers for printer A (102a) or printer B (102b). Print server A (100) then installs the printer driver on each of the clients (103). The key is configured in a way that allows only user A (140) to print to either printer A (102a) or printer B (102b). Thus, user A (140) is the only user that may send print job requests to print server A (100).

User B (141), on the other hand, may not successfully send print job request from any client (103) to print server A (100) because there is no key configured for user B (141) installed on any of the clients (103).

To meet the other objective of the present example, print server B (170) configures a key that may be used by any user on client C (103c) to send a print job request to print server B (170). The key is also configured in a way that allows a print job to be sent to any of the printers (102c,d) that are managed by print server B (170). Print server B (170) then embeds the key or a related key in either of the printer drivers for printer C (102c) or printer D (102d) and installs the print deriver on client C (103c). Thus, client C (103c) may successfully encrypt print job requests that are sent to print server B (170), regardless of its user.

As will be appreciated, the principles described herein can be used to generate any number of keys that are specific to a particular user, printer or print server so as to precisely manage the ability of any user or printer to successfully submit print jobs to a particular printer. The ability of a user to successfully submit a print job from a particular client or group of clients can also be precisely controlled.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method of controlling use of a printer on a network, said method comprising:
   with a print server, generating a key for a specific client of said print server;
   embedding said key in a printer driver;
   providing said key to said specific client on said network by installing said printer driver on said specific client, wherein said key is used to submit a print job from said client to a printer on said network.

2. The method of claim 1, further comprising using said key to encrypt said print job on said client prior to transmission of said print job to said printer.

3. The method of claim 2, further comprising using said key or a related key to decrypt said print job for use by said printer.

4. The method of claim 1, wherein said key is specific to a particular user, said method further comprising using said key to submit said print job from said client device only at the request of said particular user.

5. The method of claim 1, further comprising:
   storing a related key on a storage device of said print server.

6. The method of claim 5, further comprising:
   encrypting said print job with said key resulting in an encrypted print job;
   sending said encrypted print job from said client to said print server; and
   attempting to decrypt said encrypted print job with said related key stored on said storage device of said print server;
   wherein, if said related key correctly matches said key used to generate said encrypted print job, said print server successfully decrypts said encrypted print job and causes said printer to print said print job.

7. The method of claim 1, wherein installing said driver further comprises re-installing said driver with said key on said client if a driver without said key is already installed on said client.

8. The method of claim 1, wherein installing said driver further comprises re-configuring said driver on said client with said key if a driver without said key is already installed on said client.

9. The method of claim 1, wherein installing said driver with said key further comprises installing said key on said client without installing said driver if a driver configured to use said key is already installed on said client.

10. The method of claim 1, wherein said key allows said client to print to multiple networked printers managed by said print server.

11. The method of claim 1, wherein said key is provided to multiple clients.

12. A method of controlling a user's ability to cause a client to send a print job to a printer, said method comprising providing said client with a key specifically configured for said user, wherein said client will refuse to submit a print job to said printer for a particular user unless said key associated with that user has been provided to said client.

13. The method of claim 12, further comprising:
   generating said key with a print server; and
   transmitting said key to said client from said print server over a network to which said print server, client and printer are all connected.

14. The method of claim 13, further comprising:
   storing a related key on a storage device of said print server;
   associating said key with a printer driver for said printer; and
   installing said driver with said associated key on said client.

15. The method of claim 14, further comprising:
   encrypting said print job with said key resulting in an encrypted print job;
   sending said encrypted print job to said print server; and
   attempting to decrypt said encrypted print job with said related key on said storage device of said print server;
   wherein, if said related key correctly matches said key used to generate said encrypted print job, said print server successfully decrypts said encrypted print job and causes said printer to print said print job.

16. The method of claim 13, wherein said key allows said user to cause said client to print to multiple networked printers managed by said print server.

17. The method of claim 12, wherein said key is provided to multiple clients.

18. A system for controlling a client's ability to send a print job to a printer on a network, said system comprising:
   at least one client;
   a print server for managing distribution of print jobs to one or more printers; and
   a network connecting said at least one client device, said print server and said one or more printers;
   wherein said print server generates a key for a specific client of said print server, embeds said key in a printer driver; and installs said printer driver on said specific client, said printer server then requires said specific client to use said key provided to said client when said client is submitting a print job to said print server.

19. The system of claim 18, wherein said print server is configured to:
   generate said key with a utility; and
   store a related key on a storage device.

20. The system of claim 19, wherein said client is configured to:
   encrypt said print job with said key resulting in an encrypted print job; and
   send said encrypted print job to said print server;
   said printer server being further configured to attempt to decrypt said encrypted print job with said related key stored on said storage device.

21. The system of claim 20, wherein, if said related key correctly matches said key used to generate said encrypted print job, said print server successfully decrypts said encrypted print job and causes said printer to print said print job.

22. The system of claim 19, wherein said configuration utility is an embedded web server that resides on said print server.

23. The system of claim 19, wherein said storage device is incorporated into said print server.

24. The system of claim 19, wherein said storage device is connected to said network, but separate from said print server.

25. The system of claim 18, wherein said key allows said client to print to multiple printers managed by said print server.

26. The system of claim 18, wherein said key is provided to multiple clients.

27. The system of claim 18, wherein said key allows any user to cause said client to send said print job to said print server.

28. The system of claim 18, wherein said at least one client comprises a personal computer.

29. A system for controlling a user's ability to cause a client to print a print job to a printer on a network, said system comprising:
   a client; and
   a print server for managing at least one network printer, wherein said print server provides a key to said client for use in submitting a print job, said key being specific to a particular user of said client;
   wherein said client will refuse to submit a print job for a user unless said client has been previously provided with a key specific to that user.

30. The system of claim 29, wherein said print server comprises:
   a configuration utility for configuring said key; and
   a storage device for storing a related key.

31. The system of claim 30, wherein said print server:
   configures said key specifically for said user with said configuration utility;
   stores a related key on said storage device;
   associates said key with a printer driver for said printer; and
   installs said key in association with said driver on said client.

32. The system of claim 31, wherein said user causes said client to:
   encrypt said print job with said key resulting in an encrypted print job; and
   send said encrypted print job to said print server;
   said print server being configured to attempt to decrypt said encrypted print job with said related key stored on said storage device.

33. The system of claim 32, wherein, if said related key correctly matches said key used to generate said encrypted print job, said print server successfully decrypts said encrypted print job and causes said printer to print said print job.

34. The system of claim 30, wherein said configuration utility is an embedded web server that resides on said print server.

35. The system of claim 29, wherein said key allows said user to cause said client to print to multiple printers managed by said print server.

36. The system of claim 29, wherein said key is provided to multiple clients.

37. A system controlling use of a printer on a network, said system comprising:
   a client connected to said network for generating a print job for said printer;
   means for providing a key to said client, wherein said key is specific to a user of said client and is used to encrypt a print job from said client to said printer such that possession and use of said key, which is specific to said user of said client, identifies said client to said printer and verifies said client's authorization to submit said print job to said printer; and
   means on said client for encrypting said print job using said key to produce an encrypted print job for transmission to said printer, wherein use of said key to encrypt said print job identifies said client to said printer and verifies said client's authorization to submit said print job to said printer.

38. The system of claim 37, further comprising decryption means for using a related key to decrypt said print job for use by said printer.

39. The system of claim 38, wherein said decryption means comprise a printer server.

40. The system of claim 37, wherein said key is used by multiple clients on said network.

41. The system of claim 37, wherein said client is configured to use said key to submit said print job only at the request of said particular user.

42. The system of claim 37, wherein said means for providing a key comprise a print server on said network.

43. The system of claim 42, wherein said printer server further comprises:
   means for storing a related key on a storage device of said print server;
   means for associating said key with a printer driver for said printer; and
   means for installing said key in association with said printer driver on said client.

44. The system of claim 43, wherein said printer server further comprises:
   means for attempting to decrypt said encrypted print job with a related key;
   wherein, if said related key correctly matches said key used to generate said encrypted print job, said print server successfully decrypts said encrypted print job and causes said printer to print said print job.

45. The system of claim 37, wherein said means for encrypting said print job use said key directly to encrypt said print job.

46. The system of claim 37, wherein said means for encrypting said print job comprise an encryption algorithm which receives said key as an input with which to encrypt said print job.

* * * * *